C. L. WORRALL.
AIR WASHING DEVICE.
APPLICATION FILED JUNE 11, 1920.
1,377,381.
Patented May 10, 1921.
2 SHEETS—SHEET 1.
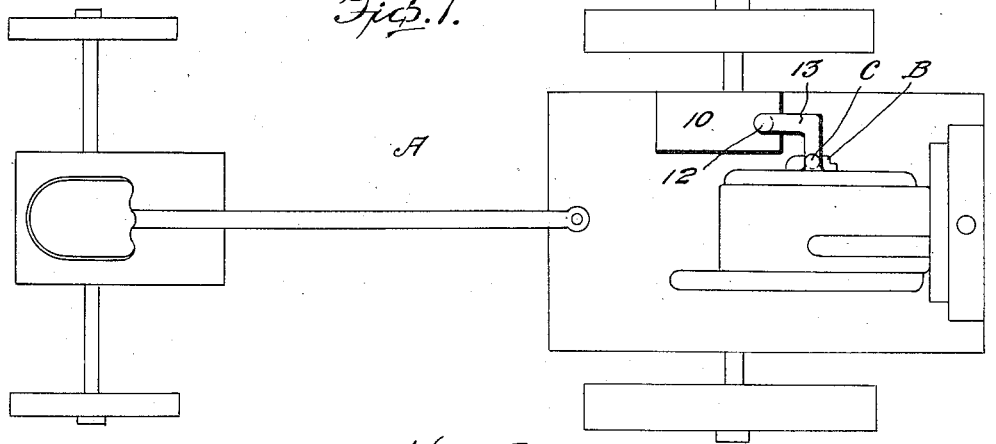
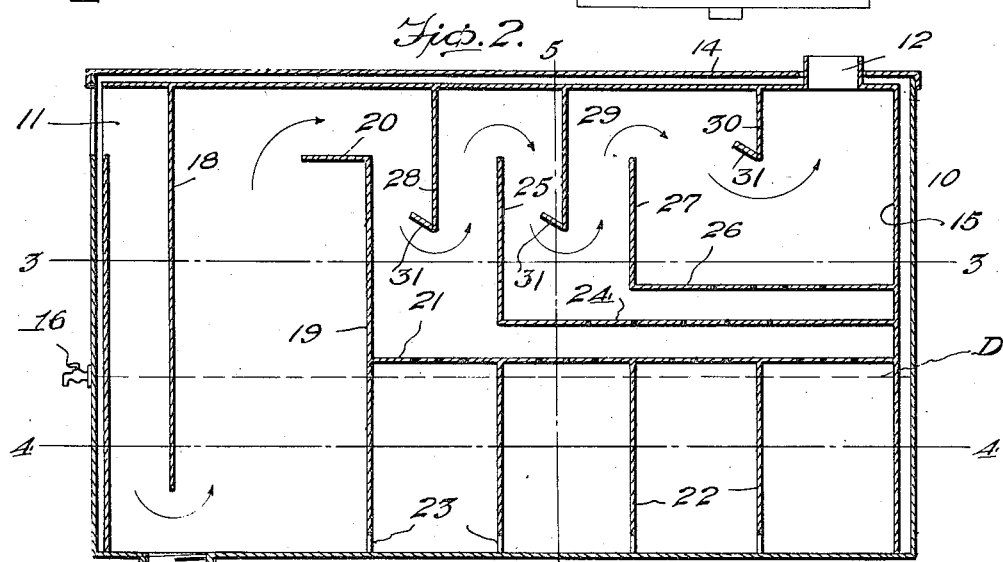
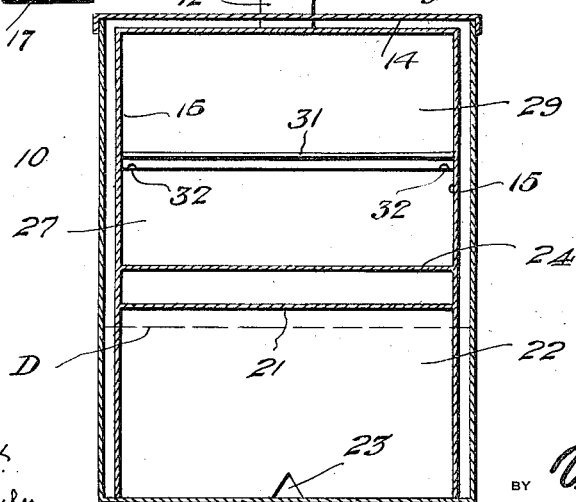
C. L. Worrall
INVENTOR
BY Victor J. Evans
ATTORNEY
WITNESS:

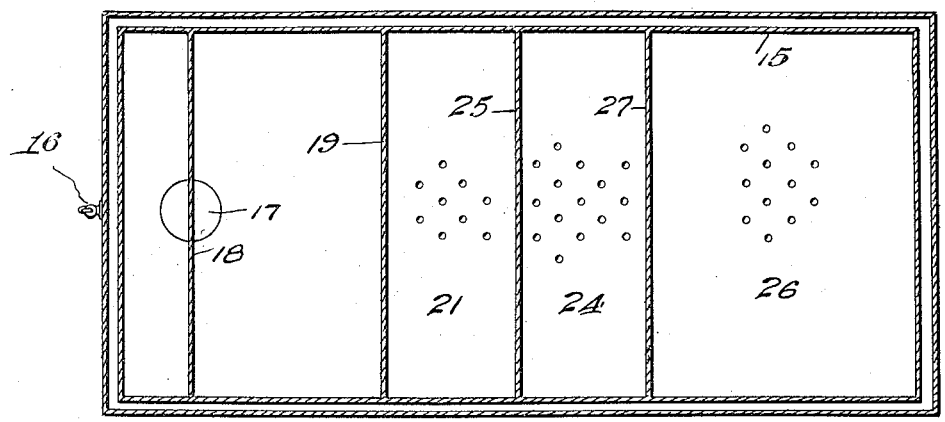
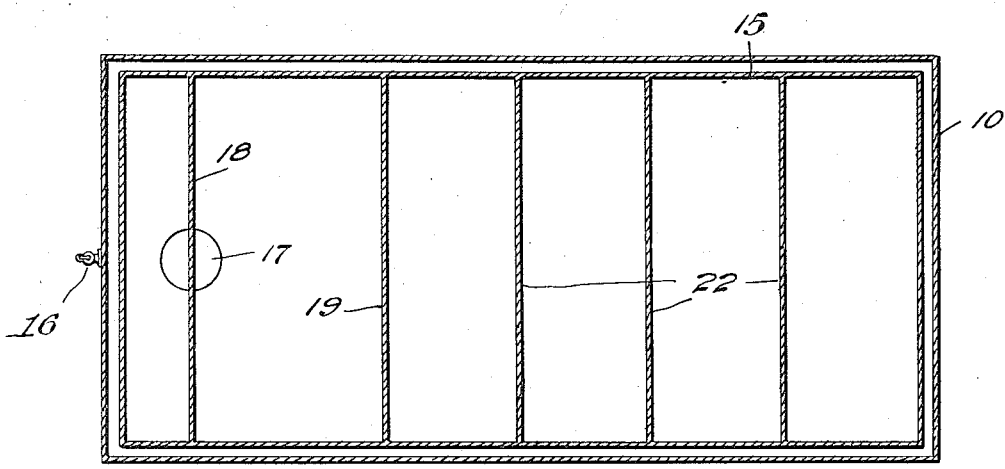

UNITED STATES PATENT OFFICE.

CHARLES L. WORRALL, OF PASADENA, CALIFORNIA.

AIR-WASHING DEVICE.

1,377,381. Specification of Letters Patent. Patented May 10, 1921.

Application filed June 11, 1920. Serial No. 388,260.

*To all whom it may concern:*

Be it known that I, CHARLES L. WORRALL, a citizen of the United States, residing at Pasadena, in the county of Los Angeles and State of California, have invented new and useful Improvements in Air-Washing Devices, of which the following is a specification.

This invention relates to air purifying devices and has for its object the provision of a device adapted for use particularly upon a tractor whereby air may be washed prior to its entry into the air inlet of the carbureter of the tractor motor, the advantage being that the device will remove from the air dust or other gritty matter which might and in fact would injure the motor and clog the carbureter.

An important object is the provision of a device of this character so constructed that the air will have the surplus moisture removed therefrom subsequent to this washing and prior to its admittance to the carbureter.

An additional object is the provision of a device of this character which will be simple and inexpensive in manufacture and installation, highly efficient in use, durable in service, and a general improvement in the art.

With the above and other objects and advantages in view, the invention consists in the details of construction to be hereinafter more fully described and claimed and illustrated in the accompanying drawings in which Figure 1 is a diagrammatic view of a tractor showing my device associated therewith, Fig. 2 is a vertical longitudinal sectional view through my device, Fig. 3 is a horizontal cross sectional view therethrough on the line 3—3 of Fig. 2, Fig. 4 is a horizontal cross sectional view on the line 4—4 of Fig. 2, and Fig. 5 is a vertical cross sectional view on the line 5—5 of Fig. 2.

Referring more particularly to the drawings, the letter A designates, rather diagrammatically, a tractor, B designates the carbureter thereof, and C designates the air intake of the carbureter.

In carrying out my invention I provide a tank 10 which is formed of sheet metal and which is preferably rectangular and oblong. This tank is provided adjacent the top of one end wall with an air inlet opening 11 and is provided in its top adjacent the other end with an air outlet opening 12 connected with the air inlet C of the carbureter by a hose or pipe 13. This tank is provided with a flanged removable cover 14 which may be secured by any desired means. Water should be introduced within the tank to any desired level, preferably about two-thirds of the way up, as shown by the line D. The tank is further provided at the desired water line with a cock 16 whereby excess water may be drained off to obtain the desired level. At some desired point in its bottom, the tank is also provided with a drain plug 17 whereby the water may be drained off when dirty.

Disposed within the tank is an inverted rectangular casing 15 including sides, ends and a top from which depends a vertical plate 18 which extends downwardly to a point somewhat below the water level so that air drawn through the tank will have to pass through the water. At a point spaced from the plate 18 I provide a vertical plate 19 which terminates short of the top and which has its upper edge formed with a flange 20 extending toward the plate 18. Secured to the plate 19 and to the sides of the casing and also to the opposite end is a horizontal plate 21 which is disposed slightly above the water level and from the under side of which extend vertical plates 22 which extend to the bottom and which are for the purpose of preventing undue slopping of the water back and forth within the tank when the tractor travels over rough ground. The plate 19 and also the plates 22 are provided at their lower edges with openings 23, which permit passage of the water through all the plates. Disposed above the plate 21 is a second horizontal plate 24 which extends entirely to one end of the casing and which has its other end extending vertically upwardly to provide a vertical plate 25 spaced from the plate 19 and terminating in the same horizontal plane therewith. A similar third horizontal plate 26 is provided arranged above the plate 24 and having one end extending vertically upwardly, as shown at 27, in spaced relation to the plate 25 and extending to the same height. The plates 21, 24 and 26 are perforated for a purpose to be hereinafter explained. Depending from the under side of the top are vertical plates 28 and 29 which are arranged, respectively, between the plates 19 and 25 and between the plates 25 and 27 and I also provide a downwardly extending plate 30 adjacent the outlet 12. At the lower edges of the plates 28, 29 and 30 are flanges 31 which serve as gutters and which are inclined toward one side of the casing and provided with holes 32.

In the operation of the device it will be seen that air sucked into the carbureter must pass through the tank and must pass through the water therein below the plate 18. After the air bubbles up through the water it will pass over the horizontal plate 20 and then in a circuitous course around the plates 28, 25, 29, 27 and 30 before it reaches the outlet 12. As the air passes along this circuitous course and strikes the various baffle plates any spray or drops of moisture will adhere to the vertical plates so that when the air reaches the outlet it will contain no surplus moisture. The water thus condensed on the vertical plates 28, 29 and 30 will drop therefrom into the troughs 31 and be led thereby to the sides of the casing and onto the horizontal plates 21, 24 and 25 and as these are perforated the water will pass back into the main body at the bottom of the tank.

From the foregoing description and a study of the drawings it will be apparent that I have thus provided a very simple and inexpensive device by means of which air may be washed and all dust and grit removed therefrom so that the air will be in proper condition for mixture with the gasolene vapor used in running the engine. It will also be observed that undue splashing or slopping of the water within the tank will be prevented and that the device will be consequently very efficient in use.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a tank provided in one end with an air inlet and at its other end with an air outlet, said tank containing water, a vertical plate extending downwardly below the water level at the air inlet end of the tank, a plurality of spaced perforated horizontal plates within the tank, vertical plates at the ends of said horizontal plates toward the inlet end of the tank terminating in spaced relation to the top of the tank, and a plurality of plates depending from the top of the casing between said vertical plates.

2. A device of the character described comprising a tank provided in one end with an air inlet and at its other end with an air outlet, said tank containing water, a vertical plate extending downwardly below the water level at the air inlet end of the tank, a plurality of horizontal plates within the tank arranged in spaced relation and perforated, all of said horizontal plates extending to the outlet end of the tank and being of successively decreasing lengths, vertical plates at the other ends of said horizontal plates terminating in spaced relation to the top of the tank, and a plurality of depending plates extending from the top of the casing between said second named vertical plates.

3. A device of the character described comprising a tank provided in one end with an air inlet and at its other end with an air outlet, said tank containing water, a vertical plate extending downwardly below the water level at the air inlet end of the tank, a plurality of spaced perforated horizontal plates within the tank, vertical plates at the ends of said horizontal plates toward the inlet end of the tank terminating in spaced relation to the top of the tank, and a plurality of plates depending from the top of the casing between said vertical plates, and out-turned flanges formed at the lower edges of said last named plates and constituting troughs, said flanges having their end portions provided with holes.

In testimony whereof I affix my signature.

CHARLES L. WORRALL.